No. 863,273. PATENTED AUG. 13, 1907.
G. E. GOWEY, W. E. LEES & J. G. BELL.
DRAFT MECHANISM FOR PLOWS.
APPLICATION FILED DEC. 3, 1906.
2 SHEETS—SHEET 1.
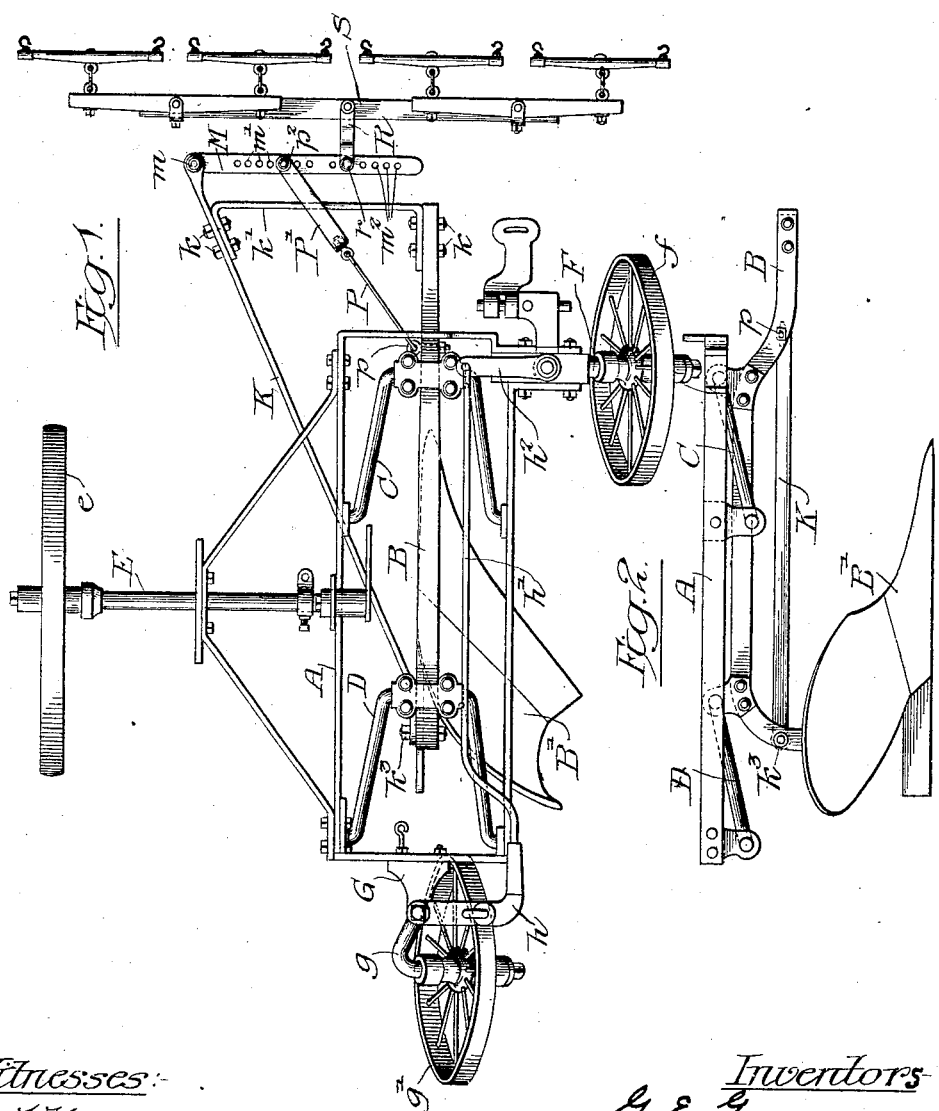

No. 863,273. PATENTED AUG. 13, 1907.
G. E. GOWEY, W. E. LEES & J. G. BELL.
DRAFT MECHANISM FOR PLOWS.
APPLICATION FILED DEC. 3, 1906.
2 SHEETS—SHEET 2.
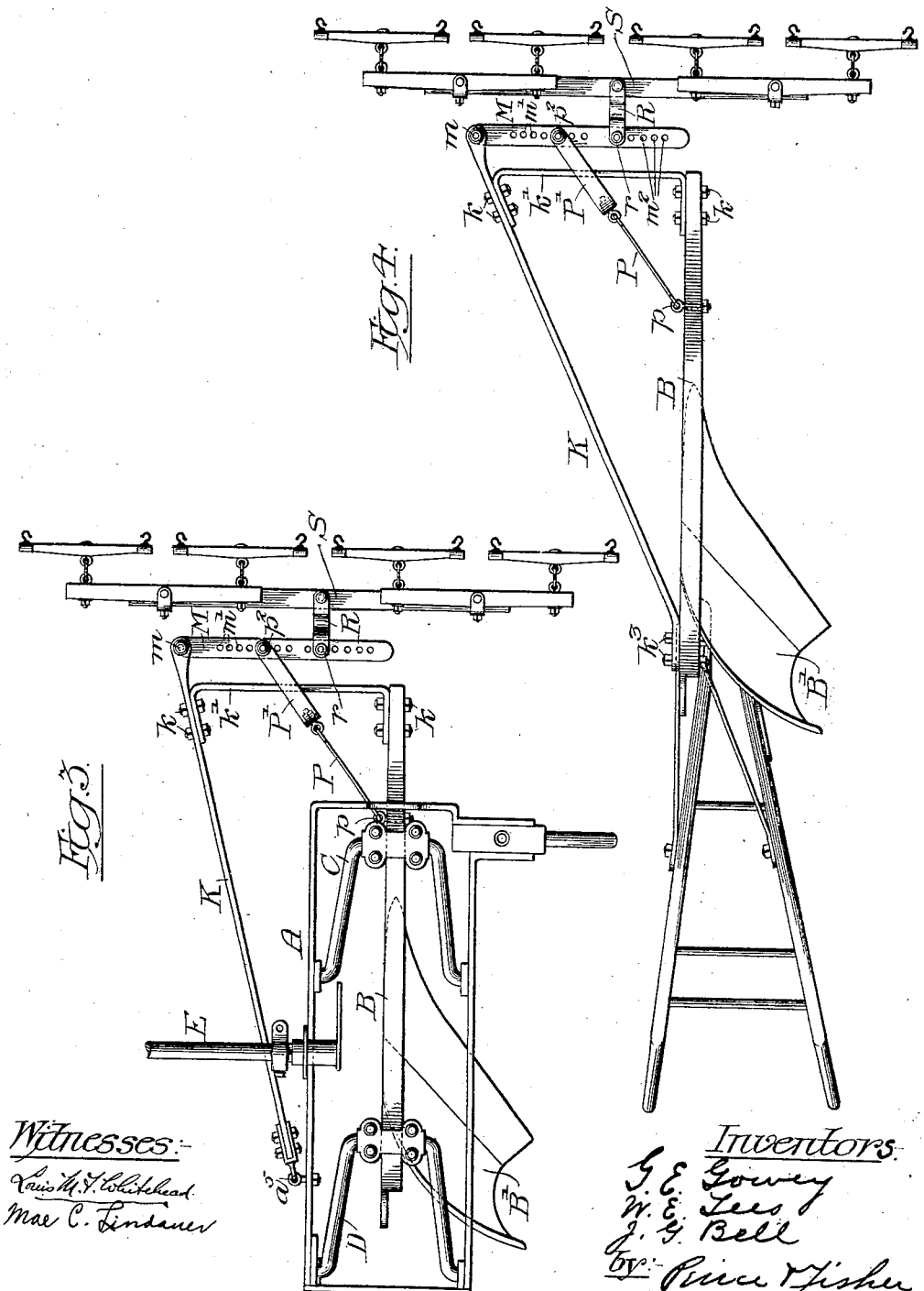

UNITED STATES PATENT OFFICE.

GILBERT E. GOWEY AND WILLIAM E. LEES, OF GARDNER, AND JOHN G. BELL, OF TALLULA, ILLINOIS.

DRAFT MECHANISM FOR PLOWS.

No. 863,273.      Specification of Letters Patent.      Patented Aug. 13, 1907.

Application filed December 3, 1906. Serial No. 346,029.

*To all whom it may concern:*

Be it known that we, GILBERT E. GOWEY and WILLIAM E. LEES, citizens of the United States, residing at Gardner, Grundy county, Illinois, and JOHN G. BELL, a citizen of the United States, residing at Tallula, Menard county, Illinois, have invented certain new and useful Improvements in Draft Mechanism for Plows, of which we do declare the following to be a full, clear, and exact description, reference being had to the accompanying drawings, forming part of this specification.

The present invention has for its object to provide improved draft mechanism for relieving the side strain upon plows, and the invention consists in the features of improvement hereinafter described, illustrated in the accompanying drawings, and particularly pointed out in the claims at the end of this specification.

Figure 1 is a plan view showing our invention as applied to a three-wheel plow. Fig. 2 is a view in side elevation, certain parts being omitted. Fig. 3 is a plan view showing a somewhat modified form of our invention. Fig. 4 is a plan view showing the invention as applied to a walking plow.

Referring more particularly to the construction shown in Figs. 1 and 2 of the drawings, A designates the main frame of a plow from which main frame the plow-beam B is supported by front and rear bails C and D. Suitably connected with the main frame, and serving to sustain it, are the usual land-wheel axle E having journaled at its outer end a land-wheel $e$, the furrow wheel axle F on which is journaled the furrow wheel $f$, and the rear caster wheel bracket G to which is connected the axle $g$ of the caster wheel $g'$. As shown, the axle $g$ of the caster wheel is suitably connected by arm $h$, link $h'$ and arm $h^2$ with the axle of the furrow wheels $f$; but the parts above described form no part of our present invention, and their construction may be varied without departure therefrom.

To the front end of the plow-beam B, which is preferably downwardly curved, as shown in Fig. 2, is bolted as at $k$ the front bar $k'$, the outer or landside end of this bar $k'$ being bolted as at $k^2$ to a thrust bar K that extends rearwardly and inwardly and is bolted, as at $k^3$, to the rear portion of the plow-beam, preferably at a slight distance above the moldboard B' of the plow. Preferably, the forward end of the thrust-bar K is extended beyond its point of connection to the front bar $k'$ and to this forwardly projecting end of the thrust bar K is pivotally connected, as at $m$, the draft lever M. This draft lever M is suitably connected by a draft rod or other suitable means to the forward portion of the plow beam B. As shown, the draft connection between the lever M and the plow beam B consists of a rod P that is pivotally connected to an eye-bolt $p$ that passes through the beam B at a slight distance back of its forward end, and, to the outer end of this draft rod P is attached a yoke P' that straddles the front bar $k'$ and is pivotally connected to the draft lever M. This pivotal connection between the yoke P' and the draft lever M is preferably effected by forming the draft lever M with a series of holes $m'$ through which passes the bolt $p^2$ that pivotally connects the yoke P' with the draft lever M. The draft lever M is provided at or adjacent its free end with a clevis R to which is connected the evener S, the clevis R being adjustably connected with the draft lever M by providing this lever with a series of holes $m^2$ through which the coupling pin $r$ of the clevis R will pass. To the evener S the double-trees for the beam will be connected in the usual or any suitable manner.

From the foregoing description it will be seen that when the strain of the team is exerted upon the evener S and is transmitted therefrom through the clevis R to the draft-lever M, a forward and side pull will be exerted upon the draft rod or connection P attached to the front portion of the plow-beam and, at the same time, a backward and side thrust will be transmitted by the thrust bar K to the rear portion of the plow beam. The effect of this combined draft upon the front portion and the thrust upon the rear portion of the plow-beam is to relieve the side strain upon the plow and insure a more accurate travel and operation of the plow, regardless of the number of horses that may be hitched abreast for drawing the plow.

It is not essential to the broad features of our invention that the draft connection and thrust bar should be attached directly to the plow-beam, although these parts should be so connected together that the forward movement of the beam shall exert a draft upon the front portion of the plow-beam and a thrust upon its rear portion. Thus, in Fig. 3 of the drawings, the thrust rod K is shown as attached not directly to the rear portion of the plow-beam, but as connected to such rear portion of the plow-beam through the medium of the main frame A to the rear portion of a side bar of which the back end of the thrust rod K is connected, by an eye-bolt $a^5$. In other respects the construction shown in Fig. 3 is the same as that illustrated in Figs. 1 and 2 of the drawings. It is manifest that with the construction shown in Fig. 3 the forward draft of the team will not only exert a pull upon the draft connection at the front end of the plow-beam, but will also, through the medium of the attachment of the thrust rod to the rear portion of the main frame A, which sustains the plow beam B, serve to exert a thrust upon the rear portion of the plow beam tending to force it away from the landside and to counteract the side pressure of the dirt against the moldboard.

In Fig. 4 of the drawings, our invention is shown as applied to a walking plow, and the parts that characterize our invention are the same as hereinbefore described. In this embodiment of our invention, the draft connection is attached to the forward portion of the plow beam and the thrust rod K is attached to the rear portion of the plow beam, as illustrated in Fig. 1 of the drawings, and the operation of our invention, when embodied in a walking plow, as shown in Fig. 4, will be found to be the same as in the wheel-plow, as illustrated in Figs. 2 and 3.

So far as we are aware, our present invention presents the first instance of a draft mechanism for plows in which there is employed a draft device connected in any suitable manner with the forward portion of the plow-beam and a thrust rod in suitable connection (either direct or indirect) with the rear portion of the plow beam, the draft device and thrust rod being united to a draft lever to which the team will be hitched at the furrow side of the point at which the draft connection is attached to said lever.

It is manifest that the precise details of construction may be varied within wide limits without departure from the scope of the invention.

Having thus described our invention what we claim as new and desire to secure by Letters Patent is:

1. A draft mechanism for plows comprising a thrust rod suitably connected to a fixed part at the rear of the plow and extending forwardly upon the land side of the plow, a draft lever pivoted to said thrust rod and extending inwardly therefrom, a clevis or hitch device connected to said draft lever at its free inner end and a draft connection suitably attached to the forward portion of the plow and connected to said draft lever between the clevis or hitch device and said thrust rod, substantially as described.

2. A draft mechanism for plows comprising a thrust rod in suitable connection with the rear portion of the plow and extending forwardly on the land side of the plow, a brace bar connecting the forward end of said thrust rod to the forward portion of the plow, a draft lever in pivotal connection with said thrust rod and extending inwardly therefrom, a clevis or hitch device connected to the free inner end of said draft lever and a draft connection connected to said draft lever between said clevis or hitch device and said thrust rod.

3. A draft mechanism for plows comprising a draft connection suitably attached to the forward portion of the plow beam, a thrust rod in suitable connection with the rear portion of the plow beam, a brace bar connected to the outer portion of said thrust rod to hold it against lateral movement, a draft lever having its land side end pivotally connected with the forward end of said thrust rod and united to the outer end of said draft connection and a clevis or hitch attached to said draft lever adjacent its free end.

4. A draft mechanism for plows comprising the combination with the plow beam of a thrust rod suitably connected to a fixed part at the rear portion of the plow and extending forwardly and outwardly therefrom and connected at its forward end with the front portion of the plow beam, a draft connection attached at its rear end to the forward portion of the plow beam and extending forwardly and outwardly therefrom, a draft lever pivotally connected with the front end of the thrust rod and with the front end of the draft connection and a clevis or hitch attached to said draft lever.

5. A draft mechanism for plows comprising the combination with the plow beam of a thrust rod fixed to the rear portion of the plow beam and extending forwardly and outwardly therefrom, a draft rod connected with the forward portion of the plow beam and extending forwardly and outwardly therefrom, a draft lever that is pivoted at its land side end to the forward end of said thrust rod and to which the forward portion of said draft rod is adjustably connected and a hitch or clevis attached to said draft lever adjacent its free end.

6. A draft mechanism for plows comprising the combination with the plow beam of a thrust rod suitably connected with the rear portion of the plow beam, a draft rod connected with the forward portion of the plow beam and provided with a yoke, a brace bar connected with the front end of the plow beam and to the forward end of the thrust rod and a draft lever pivotally connected to the forward end of the thrust rod and adjustably connected to the forward end of the draft rod.

7. A draft mechanism for plows comprising an angular frame formed of a thrust rod and brace bar, said thrust rod being suitably connected to the rear portion of the plow and extending forwardly and outwardly on the land side thereof and said brace bar being connected to the forward portion of the plow, a draft lever pivoted to said frame and extending inwardly therefrom, a clevis or hitch device connected to the free inner end of said draft lever and a draft connection from the plow engaging said draft lever between said clevis or hitch device and its point of connection with said frame.

8. A draft mechanism for plows comprising an angular frame formed of a thrust rod and a brace bar, said thrust rod being fixed at its rear end to the rear portion of the plow beam and extending forwardly and outwardly therefrom on the land side of the plow and said brace bar being connected to the forward portion of the plow beam, a draft lever pivotally connected to said thrust rod and extending inwardly therefrom, a clevis or hitch device connected to the free inner end of said draft lever and a draft connection extending from the plow and engaging said draft lever at a point between said clevis or hitch device and said thrust rod.

GILBERT E. GOWEY.
                WILLIAM E. LEES.
                JOHN G. BELL.

Witnesses to signatures of Messrs. Gowey & Lees:
    JOHN BARTON,
    ABRAHAM L. BOOTH.

Witnesses to signature of John G. Bell:
    RICHARD B. RUH,
    JAMES A. HENDERSON.